(12) United States Patent
Elliott

(10) Patent No.: US 6,325,137 B1
(45) Date of Patent: Dec. 4, 2001

(54) PORTABLE LIQUID COOLING AND HEATING APPARATUS

(76) Inventor: Frank S. Elliott, 1208 E. Christy Dr., Phoenix, AZ (US) 85020

( * ) Notice: Subject to any disclaimer, the term of this patent is extended or adjusted under 35 U.S.C. 154(b) by 0 days.

(21) Appl. No.: 09/570,850

(22) Filed: May 12, 2000

Related U.S. Application Data

(63) Continuation-in-part of application No. 09/110,348, filed on Jul. 6, 1998.

(51) Int. Cl.[7] ........................................ F24H 3/06
(52) U.S. Cl. .............................. 165/122; 165/47; 165/75; 62/371
(58) Field of Search ................... 165/73, 74, 75, 165/58, 59, 60, 122, 47; 237/19; 62/371, 425

(56) References Cited

U.S. PATENT DOCUMENTS

| 1,189,470 | * | 7/1916 | O'Brien | 165/47 |
| 1,884,095 | * | 10/1932 | Modine | 165/60 |
| 2,025,216 | * | 12/1935 | Opitz | 165/58 |
| 5,121,788 | * | 6/1992 | Carollo | 165/47 |
| 5,220,807 | * | 6/1993 | Bourne et al. | 165/58 |
| 5,524,820 | * | 6/1996 | Regan | 237/19 |

* cited by examiner

Primary Examiner—Ira S. Lazarus
Assistant Examiner—Terrell McKinnon
(74) Attorney, Agent, or Firm—H. Gordon Shields

(57) ABSTRACT

A portable housing holds a quantity of ice and water and the water is circulated through a heat exchanger. A blower circulates air from the room in which the housing is disposed through the heat exchanger and back into the room for cooling the room. The housing includes a relatively large chamber for holding the ice and a relatively smaller chamber in which the blower and the heat exchanger are disposed. Melt water from the ice, or cooled water or cooled liquid, is pumped through the heat exchanger and from the heat exchanger the liquid flows by gravity back to the ice and water chamber.

20 Claims, 2 Drawing Sheets

PORTABLE LIQUID COOLING AND HEATING APPARATUS

CROSS REFERENCE TO RELATED APPLICATION

This application is a Continuation In Part application of Ser. No. 09/110,348, which was filed Jul. 6 1998.

BACKGROUND OF THE INVENTION

1. Field of the Invention

This invention relates to portable apparatus for cooling and heating air in a room or the like and, more particularly, to the cooling of air by using ice and ice water for cooling through a heat exchanger.

2. Description of the Prior Art

There are essentially two types of systems for cooling air, the simplest is an evaporative air cooler where pads are soaked with water and a blower is used to blow air through the soaked pads. The air is evaporatively cooled as it moves through the soaked pads and is then blown into a room, a building, etc. This type of evaporative air cooling system functions quite well where or when the environment has relatively low humidity. As the humidity rises, the efficiency of evaporated air cooling systems decreases.

The second general system of cooling air is a refrigeration system in which air is blown past evaporator coils through which a refrigerant flows.

An alternate low cost, portable, and limited system of the latter is the use of a cooling medium, such as ice, to cool water, and the cooled water is passed through coils. Air is blown past the coils and heat is exchanged. The cooled air is then circulated through a building, room, etc.

U.S. Pat. No. 5,762,129, the inventor of which is the inventor of the present invention, discloses two general types of cooling (or heating) systems having a generally horizontal configuration. Two types are illustrated, open systems in which the coolant medium is circulated and cooled and recirculated, and a closed loop type system in which a coolant medium is circulated through a heat exchanger and a separate medium is used to cool the circulating coolant medium.

SUMMARY OF THE INVENTION

The invention described and claimed herein includes a relatively small, preferably circular, portable housing in which is disposed a quantity of ice and cooled water. The ice cools the water, and a submersible pump is used to pump the cooled water to a heat exchanger. Within the housing and above the water and ice is a separate chamber in which a blower and a heat exchanger are disposed. The blower and heat exchanger are disposed on a removable panel or support wall, and a cap is secured to the panel to cover the blower and heat exchanger. The panel and cap are moved off the housing to put the water and ice into the housing. The pump is used to pump water through the heat exchanger, and a blower is used to pull air through the heat exchanger. The cooled air is blown into the room in which the apparatus is disposed. The use of hot water instead of cold water allows the apparatus to be used as a portable heater. The apparatus is vertically oriented and is thus rather compact.

Among the objects of the present invention are the following:

To provide new and useful apparatus for cooling a room;

To provide new and useful apparatus for cooling a room using ice and its melt water as a cooling medium;

To provide new and useful apparatus using water as a cooling medium;

To provide new and useful portable apparatus for heating and cooling using a heat exchange medium and a submersible pump and a blower;

To provide new and useful portable apparatus for holding a quantity of ice and water and for circulating the water through a heat exchanger and a blower for circulating air through the heat exchanger and into a room in which the apparatus is disposed; and To provide new and useful apparatus including a generally vertically oriented housing utilizing ice and water as a cooling medium in the housing and a heat exchanger and blower disposed above the cooling medium for cooling a room.

DESCRIPTION OF THE PREFERRED EMBODIMENT

Figure 2:
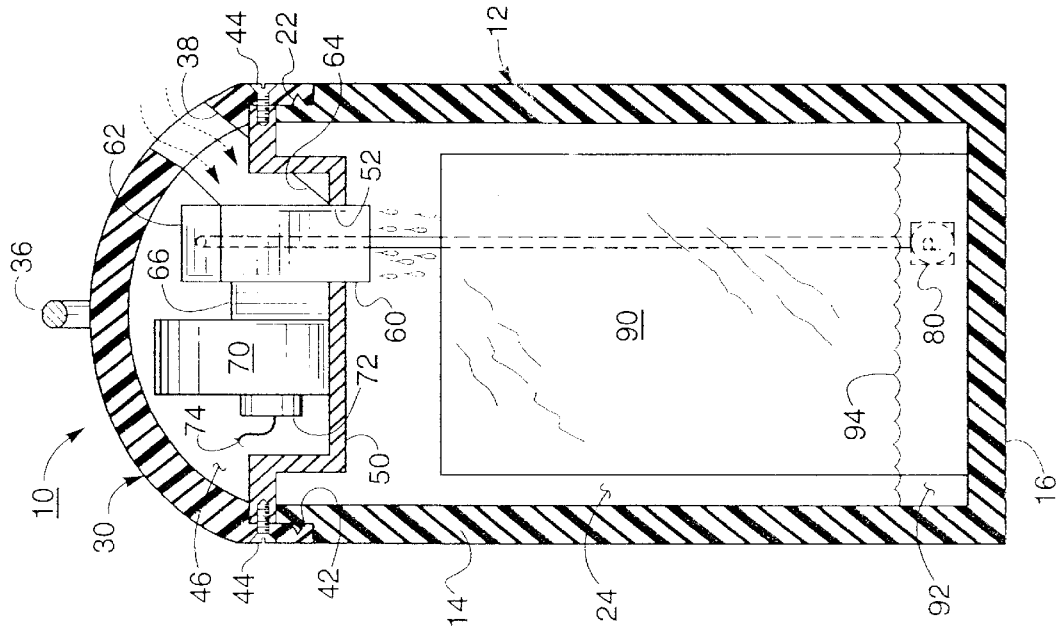
FIG. 2 is a view in partial section taken generally along line 2—2 of FIG. 1.
Figure 1:
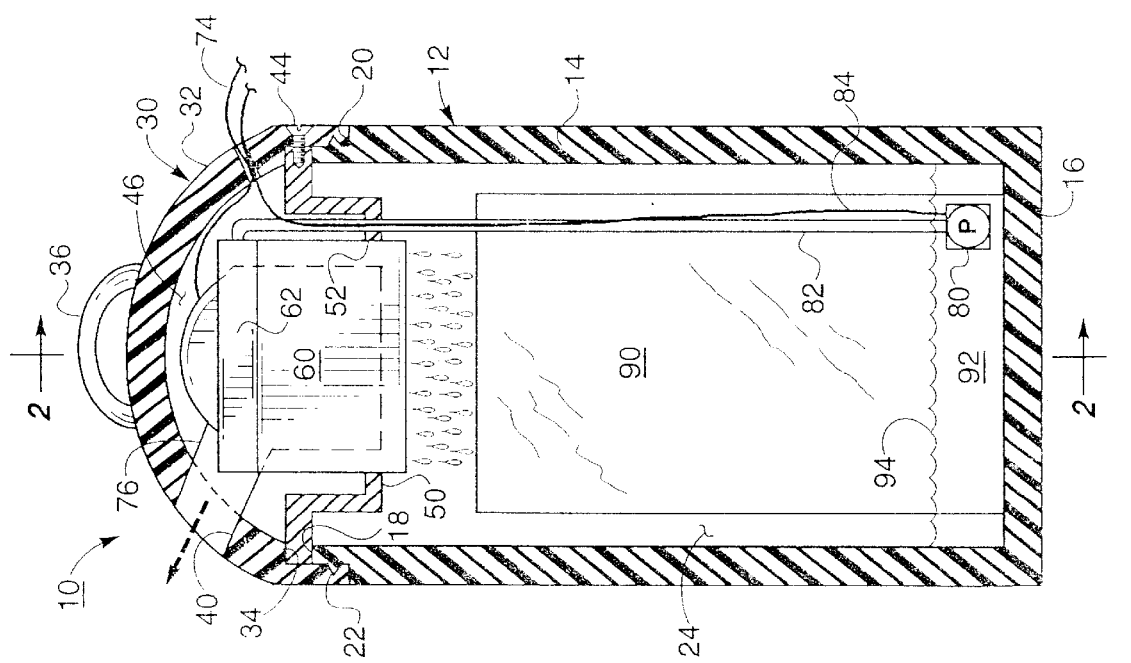
FIG. 1 is a view in partial section of the apparatus of the present invention.

FIG. 1 is a view in partial section of cooler apparatus 10 of the present invention. FIG. 2 is a view in partial section of the apparatus 10 taken generally along line 2—2 of FIG. 1. For the following discussion, reference will primarily be made to FIGS. 1 and 2.

Cooler apparatus 10 includes a housing 12 which is generally of a circular configuration. The housing includes a vertically oriented circular insulated wall 14. The housing 12 is closed by an insulated bottom wall 16.

There is a rim 18 on the upper end of the circular wall 14, and annular shoulder 20 is disposed outwardly from the rim 18.

The housing 12 is closed by a cap 30. The cap 30 includes a dome 32. The cap 30 is disposed on the shoulder 20 of the housing 12 and is secured to the housing 12 by the mating engagement of external threads 22 on the housing 12 and internal threads 42 on the cap 30.

A horizontal support wall or panel 50 is disposed on the rim 18 and is held in place by the cap 30. The cap 30 is secured to the support wall or panel 50 by a plurality of appropriate fasteners, such as screws 44.

Beneath the wall or panel 50 and within the housing 12 is a chamber 24. The chamber 24 may be considered as the cooling medium chamber.

Extending through the dome 32 of the cap 30 are two apertures, including an air intake aperture 38 and an exhaust or air discharge aperture 40. On the top of the dome 30 is a handle 36. Between the panel 50 and the dome 32 is a heat exchange chamber 46.

The support wall 50 includes an aperture 52 through which extends a heat exchanger 60. The heat exchanger 60 includes a header 62 which receives cooling fluid, as will be discussed below.

Disposed on the support wall 50 is a blower 70. The intake air through the aperture 38 flows through the heat exchanger 60 and out through the air out aperture 40 in response to the blower 70. In FIG. 2, a motor 72 is schematically illustrated, with its conductor pair 74 extending to an appropriate current source, not shown.

A submersible pump 80 is disposed slightly above the bottom wall 16. A conduit 82 extends from the submersible pump 80 to the header 62 of the heat exchanger 60. A conductor pair 84 extends from the pump 80. Switches (not shown) are disposed in the conductor pairs 74 and 84, as appropriate. Preferably, the power for the pump 80 and the motor 72 is provided by a 12-volt system, either a battery or a transformed and rectified 12-volt DC current from a 110 volt system.

A block of ice 90 is disposed in the housing 12 on the bottom wall 16. In order to begin the cooling process, water 92 with a minimum level of 94 is placed in the housing 12. The cap 30 and the panel or support wall 50 are removed in order to add water and ice to the housing 12. After the water and ice are put into the housing, the cap 30, secured to the support wall or panel 50, with the heat exchanger 60 and the blower 70 secured thereto, is then secured back onto the housing 12. The appropriate electrical connection is then made to the conductor pair 74.

The water 92 is then pumped through the conduit 82 by the pump 80 to the header 62 of the heat exchanger 60. The cooled water then flows through the heat exchanger 60 and falls downwardly onto the ice block 90 and again pools at the bottom of the housing 12. With the blower motor 72 actuated, air is pulled through the heat exchanger 60 from or through the opening or aperture 64 and into the blower 70 and outwardly from the blower 70 through the opening 40 in the dome 32 of the cap 30. The air is appropriately ducted, as required, for the most efficient flow of air through the heat exchanger and into the blower. The ducting may be accomplished in any appropriate manner. The ducting is schematically illustrated in FIGS. 1 and 2 by an intake duct 64 and a duct 66 between the heat exchanger 60 and the blower 70 in FIG. 2, and an exhaust duct 76 in FIG. 1.

It will be noted that the apparatus of the present invention may also be used for heating a room or area, rather than cooling, as has been described. The only difference, obviously, is in the type of heat exchanger medium used. Thus, if hot water or a hot liquid is disposed in the housing and pumped through the heat exchanger, the flow of air through the heat exchanger will be heated, and the heated air will then be blown into the room or area in which the apparatus is disposed.

Figure 3:
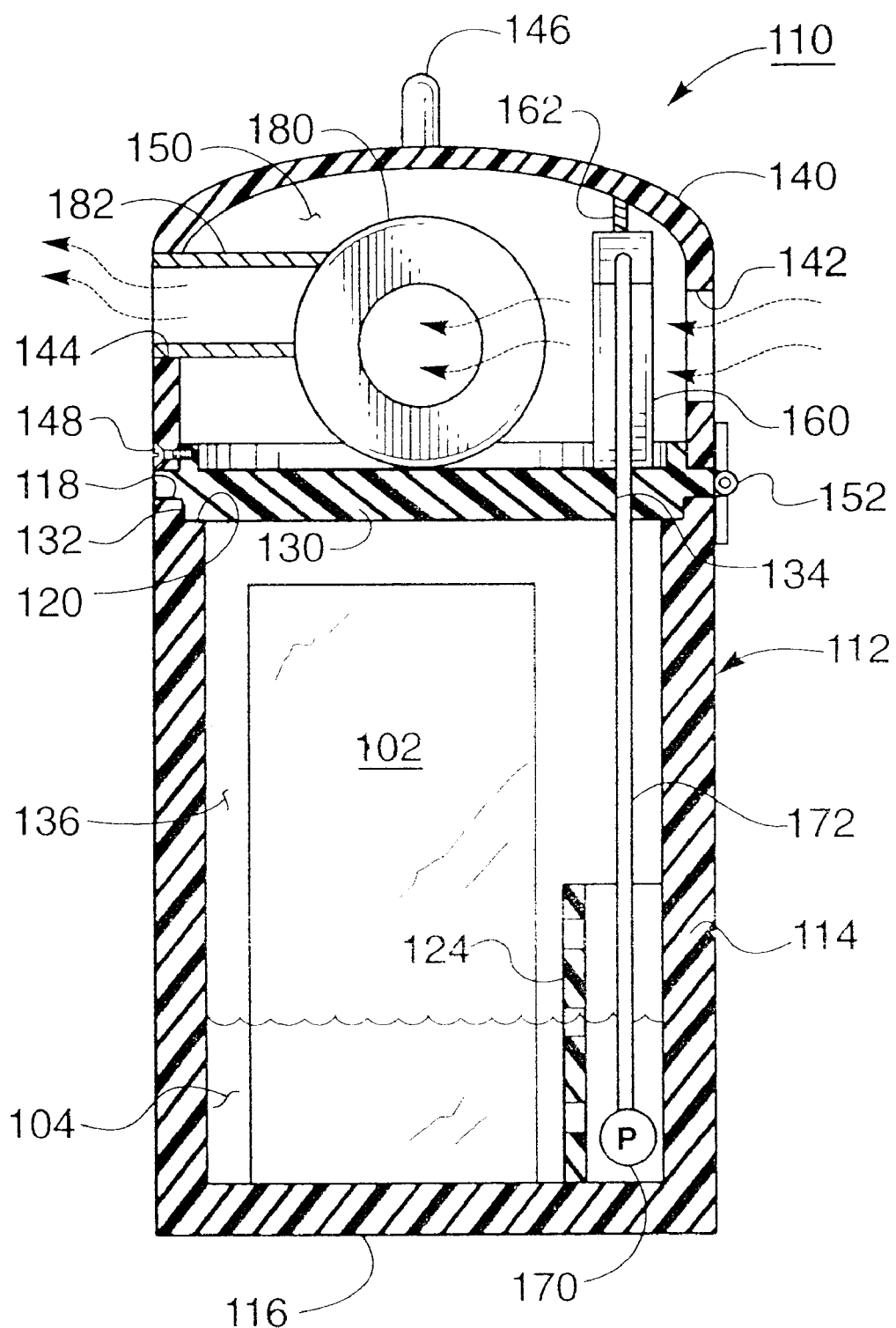
FIG. 3 is a view in partial section of an alternate embodiment of the apparatus of FIGS. 1 and 2.

FIG. 3 comprises a view in partial section through an alternate embodiment 110 of the apparatus of the present invention. The apparatus 110 includes a housing 112 which again is preferably a circular cylindrical configuration. The housing 112 includes a vertical wall 114 and a bottom wall 116. The housing and its related components, will be discussed below, are insulated, as discussed above with respect to apparatus 10. Like the apparatus 10, the apparatus 110 is vertically oriented.

At the top of the vertical wall 114 is a rim 118. A ledge or shoulder 120 is defined on the inside of the vertical wall 114 spaced a relatively short distance downwardly from the rim 118.

Extending upwardly from the bottom wall 116 and adjacent to the vertical wall 114 is a pump baffle 124. The purpose of the pump baffle 124 will be discussed below.

A horizontally extending panel or lid 130 is disposed on the vertical wall 114 at the rim 118 and ledge or shoulder 120. The panel or lid 130 includes a recess 132 which matingly engages the shoulder 120 at the rim 118. An aperture 134 extends through the panel or lid 130. A chamber 136 is defined within the housing 112 beneath the panel or lid 130.

A dome 140 is disposed on and secured to the panel or lid 130. The dome 140 includes two apertures or ports, including an air intake aperture or port 142 and an exhaust aperture or port 144. At the top of the dome 140 is a handle 146. The dome 140 is secured to the lid or horizontal panel 130 by a plurality of fasteners, such as screws 148.

Beneath the dome 140 and above the panel 130 is a chamber 150. The chamber 150 encloses a heat exchanger 160 and a blower 180, both of which are disposed on and secured to the panel 130.

A hinge 152 is secured to the housing 112 and to the dome 140 and panel 130 to allow the panel 130 and the dome 140 to pivot relative to the housing 112. The hinges, of course, appropriately secured to the respective elements.

The heat exchanger 160 is connected to a submersible pump 170 by a flexible conduit 172. The purpose of the flexible conduit 172 is, of course, to allow the pump 170 to move upwardly as the dome 140 and the panel 130 and their associated elements pivots relative to the housing 112.

A baffle wall 162 is disposed about the heat exchanger 160 to insure that the flow of incoming air through the port 142 is controlled in such a manner that the flow of air is through the heat exchanger 160. This, of course, prevents the incoming air from flowing around the heat exchanger 160. Thus the baffle controls the flow of air through the port 142 and directs it through the heat exchanger 160. From the heat exchanger 160 air flows to a blower 180 which is also disposed on and secured to the panel 130. From the blower 180, the cooled air flows through a duct 182 and outwardly through the aperture or port 144 to cool the room in which the apparatus is disposed.

A block of ice 102 is disposed within the chamber 136 of the housing 112, beneath the panel 130. The ice block 102 in disposed on water 104, which water comprises the cooling medium for the apparatus 110. The ice 102 cools the water 104 and contributes to the volume of water 104 as the ice melts. Thus, the melt water continues the cooling of the cooling medium, namely the water 104.

The pump 170 is, of course, a submersible pump and is disposed below the level of the water 104. The pump 170 is disposed behind the baffle 124. The baffle accordingly protects the pump 170 from possible destruction or harm caused by any movement of the block of ice 102, or any fragments thereof. The baffle 124 may be appropriately perforated, etc., so as to allow for the substantially unimpeded flow of the water 104 through the baffle 124 and to the pump 170.

The primary differences between the cooling apparatus 10 of FIGS. 1 and 2 and the cooling apparatus 110 of FIG. 3 is in the use of a baffle 162 about the heat exchanger 160 rather than the duct work used to control the flow of air in the apparatus 10 and the use of a hinged cap and associated elements. Secondarily, a difference may be in the use of a flexible conduit 172 for the pump 170, rather than a relatively inflexible conduit 82 used in conjunction with the pump 80. Obviously, the conduit 82 may also be flexible, if desired.

It will be noted that the electrical connections for the pump 170 and the blower 180 had been omitted from FIG. 3 for purposes of clarity.

Finally, while a submersible pump and a generally round housing have been discussed, it is obvious that other housing configurations may also be used, and other types of pumps may also be used.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Apparatus for cooling an area comprising in combination:

housing means including a first chamber for holding a quantity of a liquid cooling medium;

a panel disposed on the housing means;

a heat exchanger disposed on the panel;

pump means for pumping the liquid cooling medium to the heat exchanger;

means for circulating air through the heat exchanger and to the area to be cooled; and dome means secured to the panel and defining therewith a second chamber and secured to the housing means and removable with the panel for adding the cooling medium to the housing means, including aperture means through which air to be cooled flows into the dome means and through which cooled air flows out of the dome means.

2. The apparatus of claim 1 in which the means for circulating air includes a blower disposed on the panel adjacent to the heat exchanger.

3. The apparatus of claim 2 in which the pump means comprises a submersible pump and a conduit extending from the pump to the heat exchanger.

4. The apparatus of claim 3 which further includes means for cooling the cooling medium.

5. The apparatus of claim 3 in which the dome means comprises a dome enclosing the heat exchanger and the blower.

6. The apparatus of claim 5 in which the aperture means includes a first aperture through which air is drawn for providing a flow of air to the heat exchanger, and a second aperture through which cooled air from the heat exchanger flows to the area to be cooled.

7. The apparatus of claim 6 which further includes ducts for directing the flow of air from the first aperture to the heat exchanger and from the heat exchanger to the blower and from the blower to the second aperture.

8. The apparatus of claim 6 in which the dome means further includes a baffle for controlling the flow of air from the first aperture to the heat exchanger.

9. Cooling apparatus comprising combination:

a housing;

a quantity of water in the housing;

a quantity of ice in the water for cooling the water;

a support wall disposed on the housing and movable for adding the quantities of water and ice in the housing;

a heat exchanger disposed on the support wall above the water;

pump means for pumping the water to the heat exchanger;

dome means secured to the support wall and movable with the support wall for adding the quantities of water and ice to the housing; and means for providing a flow of air to be cooled through the heat exchanger and disposed on the support wall.

10. The apparatus of claim 9 in which the means for providing a flow of air includes a blower.

11. Apparatus of claim 10 in which the dome means includes a first port through which air flows into the dome means and second port through which cooled air flows from the dome means.

12. The apparatus of claim 11 in which the dome means further includes a baffle about the heat exchanger for limiting the flow of air into the dome means through the heat exchanger.

13. The apparatus of claim 9 in which the housing is generally round.

14. The apparatus of claim 9 in which the pump means includes a submersible pump.

15. The apparatus of claim 14 in which the housing means includes a protective baffle adjacent to the submersible pump.

16. The apparatus of claim 9 in which the support wall and dome means are pivotally secured to the housing for adding water and ice.

17. Cooling apparatus comprising in combination:

a housing;

a quantity of liquid in the housing;

a support wall above the liquid and pivotally secured to the housing;

a heat exchanger on the support wall;

a blower for circulating air through the heat exchanger;

a pump for pumping the liquid through the heat exchanger; and a dome secured to the support wall and pivotal with the support wall for adding liquid to the housing, including a first aperture to provide a flow of air through the heat exchanger, and a second aperture through which the air flows out of the dome.

18. The apparatus of claim 17 in which the pump is a submersible pump.

19. The apparatus of claim 17 which further includes a baffle for directing the flow of air into and out of the heat exchanger.

20. The apparatus of claim 17 in which the dome encases the heat exchanger and the blower.

* * * * *